(12) United States Patent
Wei et al.

(10) Patent No.: US 9,319,878 B2
(45) Date of Patent: Apr. 19, 2016

(54) STREAMING ALIGNMENT OF KEY STREAM TO UNALIGNED DATA STREAM

(71) Applicant: QUALCOMM Incorporated, San Diego, CA (US)

(72) Inventors: Justin Y. Wei, Sunnyvale, CA (US); Antoine Dambre, Grasse (FR); Christopher Ahn, San Diego, CA (US); Gurvinder Singh Chhabra, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 250 days.

(21) Appl. No.: 14/024,444

(22) Filed: Sep. 11, 2013

(65) Prior Publication Data

US 2014/0079220 A1 Mar. 20, 2014

Related U.S. Application Data

(60) Provisional application No. 61/701,388, filed on Sep. 14, 2012.

(51) Int. Cl.
*H04W 12/04* (2009.01)
*H04L 9/06* (2006.01)
(Continued)

(52) U.S. Cl.
CPC .............. *H04W 12/04* (2013.01); *H04L 9/0656* (2013.01); *H04L 9/0891* (2013.01); *H04L 49/90* (2013.01); *H04L 63/062* (2013.01); *H04L 63/08* (2013.01); *H04L 9/26* (2013.01); *H04L 2209/20* (2013.01); *H04L 2209/80* (2013.01)

(58) Field of Classification Search
None
See application file for complete search history.

(56) References Cited

U.S. PATENT DOCUMENTS 3,958,081 A * 5/1976 Ehrsam et al. ............... 380/29
5,546,464 A   8/1996 Raith et al.
(Continued)

OTHER PUBLICATIONS

Fuhr T. et al., "Analysis of the Initial and Modified Versions of the Candidate 3GPP Integrity Algorithm 128-EIA3", Field Programmable Logic and Application, Jan. 1, 2012, Springer Berlin, Heidelberg, vol. 7118, pp. 230-242, XP055098951, ISSN: 0302-9743, ISBN: 978-3-54-045234-8, DOI: 10.1007/978-3-642-28496-0_14.
(Continued)

*Primary Examiner* — Nirav B Patel
*Assistant Examiner* — Abdulhakim Nobahar
(74) *Attorney, Agent, or Firm* — Norton Rose Fulbright US LLP

(57) ABSTRACT

Enhanced cryptographic techniques are provided which facilitate higher data rates in a wireless communication system. In one aspect, improvements to the ZUC algorithm are disclosed which can reduce the number of logical operations involved key stream generation, reduce computational burden on a mobile device implementing ZUC, and extend battery life. The disclosed techniques include, for instance, receiving, at a wireless communication apparatus, a data stream having data packets for ciphering or deciphering. The wireless apparatus can generate a cipher key for the cryptographic function, determine a starting address of a first data packet in the data stream and shift the cipher key to align with the starting address of the first data packet. Once aligned, the processing apparatus applies the cryptographic function to a first block of the first data packet using the shifted cipher key and manages a remaining portion of the cipher key to handle arbitrarily aligned data across multiple packets.

32 Claims, 8 Drawing Sheets

(51) Int. Cl.
*H04L 9/08* (2006.01)
*H04L 29/06* (2006.01)
*H04L 12/861* (2013.01)
*H04L 9/26* (2006.01)

(56) References Cited

U.S. PATENT DOCUMENTS

| | | | | |
|---|---|---|---|---|
| 5,860,136 | A | * | 1/1999 | Fenner .......................... 711/201 |
| 6,267,293 | B1 | * | 7/2001 | Dwinell et al. .......... 235/462.12 |
| 7,818,563 | B1 | | 10/2010 | Dwork et al. |
| 2004/0125799 | A1 | | 7/2004 | Buer |
| 2004/0143710 | A1 | | 7/2004 | Walmsley |
| 2009/0046856 | A1 | | 2/2009 | Mitchell |
| 2009/0316904 | A1 | | 12/2009 | Klingenbrunn et al. |
| 2015/0163051 | A1 | * | 6/2015 | Suzuki .......................... 713/189 |

OTHER PUBLICATIONS

International Search Report and Written Opinion—PCT/US2013/059483—ISA/EPO—Feb. 4, 2014.
Orhanou G. et al., "EPS Confidentiality and Integrity mechanisms Algorithmic Approach", International Journal of Computer Science Issues (IJCSI), Jul. 1, 2010, vol. 7, No. 4, pp. 15-23, Mahebourg, XP055097295, ISSN: 1694-0814.

* cited by examiner

STREAMING ALIGNMENT OF KEY STREAM TO UNALIGNED DATA STREAM

CROSS-REFERENCE TO RELATED APPLICATIONS

This application claims the benefit of U.S. Provisional Patent Application No. 61/701,388, entitled, "STREAMING ALIGNMENT OF KEY STREAM TO UNALIGNED DATA STREAM", filed on Sep. 14, 2012, which is expressly incorporated by reference herein in its entirety.

BACKGROUND

1. Field

Aspects of the present disclosure relate generally to wireless communication systems, and more particularly, to streaming alignment of a cipher key stream to an unaligned data stream.

2. Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance the UMTS technologies not only to meet the growing demand for mobile broadband access, but to advance and enhance the user experience with mobile communications.

SUMMARY

Various aspects of the present disclosure relate to enhanced cryptographic techniques which facilitate higher data rates in a wireless communication system. In one aspect, improvements to the ZUC algorithm are disclosed which can reduce the number of logical operations involved key stream generation, reduce computational burden on a mobile device implementing ZUC, and extend battery life. The disclosed techniques include, for instance, receiving, at a wireless communication apparatus, a data stream having data packets for ciphering or deciphering. The wireless apparatus can generate a cipher key for the cryptographic function, determine a starting address of a first data packet in the data stream and shift the cipher key to align with the starting address of the first data packet. Once aligned, the processing apparatus applies the cryptographic function to a first block of the first data packet using the shifted cipher key and manages a remaining portion of the cipher key to handle arbitrarily aligned data across multiple packets In one aspect of the disclosure, a method of wireless communication includes receiving, at a wireless communication apparatus, a data stream having one or more data packets for a cryptographic function, generating a cipher key for the cryptographic function, determining a starting address of a first data packet in the data stream, shifting the cipher key to align with the starting address of the first data packet, and applying the cryptographic function to a first block of the first data packet using the shifted cipher key.

In an additional aspect of the disclosure, an apparatus configured for wireless communication that includes means for receiving, at a wireless communication apparatus, a data stream having one or more data packets for a cryptographic function, means for generating a cipher key for the cryptographic function, means for determining a starting address of a first data packet in the data stream, means for shifting the cipher key to align with the starting address of the first data packet, and means for applying the cryptographic function to a first block of the first data packet using the shifted cipher key.

In an additional aspect of the disclosure, a computer program product has a computer-readable medium having program code recorded thereon. This program code includes code to receive, at a wireless communication apparatus, a data stream having one or more data packets for a cryptographic function, code to generate a cipher key for the cryptographic function, code to determine a starting address of a first data packet in the data stream, code to shift the cipher key to align with the starting address of the first data packet, and code to apply the cryptographic function to a first block of the first data packet using the shifted cipher key.

In an additional aspect of the disclosure, an apparatus includes at least one processor and a memory coupled to the processor. The processor is configured to receive, at a wireless communication apparatus, a data stream having one or more data packets for a cryptographic function, to generate a cipher key for the cryptographic function, to determine a starting address of a first data packet in the data stream, to shift the cipher key to align with the starting address of the first data packet, and to apply the cryptographic function to a first block of the first data packet using the shifted cipher key.

DETAILED DESCRIPTION

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The techniques described herein may be used for various wireless communication networks such as CDMA, TDMA, FDMA, OFDMA, SC-FDMA and other networks. The terms "network" and "system" are often used interchangeably. A CDMA network may implement a radio technology, such as Universal Terrestrial Radio Access (UTRA), Telecommunications Industry Association's (TIA's) CDMA2000®, and the like. The UTRA technology includes Wideband CDMA (WCDMA) and other variants of CDMA. The CDMA2000® technology includes the IS-2000, IS-95 and IS-856 standards from the Electronics Industry Alliance (EIA) and TIA. A TDMA network may implement a radio technology, such as Global System for Mobile Communications (GSM). An OFDMA network may implement a radio technology, such as Evolved UTRA (E-UTRA), Ultra Mobile Broadband (UMB), IEEE 802.11 (Wi-Fi), IEEE 802.16 (WiMAX), IEEE 802.20, Flash-OFDMA, and the like. The UTRA and E-UTRA technologies are part of Universal Mobile Telecommunication System (UMTS). 3GPP Long Term Evolution (LTE) and LTE-Advanced (LTE-A) are newer releases of the UMTS that use E-UTRA. UTRA, E-UTRA, UMTS, LTE, LTE-A and GSM are described in documents from an organization called the "3rd Generation Partnership Project" (3GPP). CDMA2000® and UMB are described in documents from an organization called the "3rd Generation Partnership Project 2" (3GPP2). The techniques described herein may be used for the wireless networks and radio access technologies mentioned above, as well as other wireless networks and radio access technologies. For clarity, certain aspects of the techniques are described below for LTE or LTE-A (together referred to in the alternative as "LTE/-A") and use such LTE/-A terminology in much of the description below.

Figure 1:
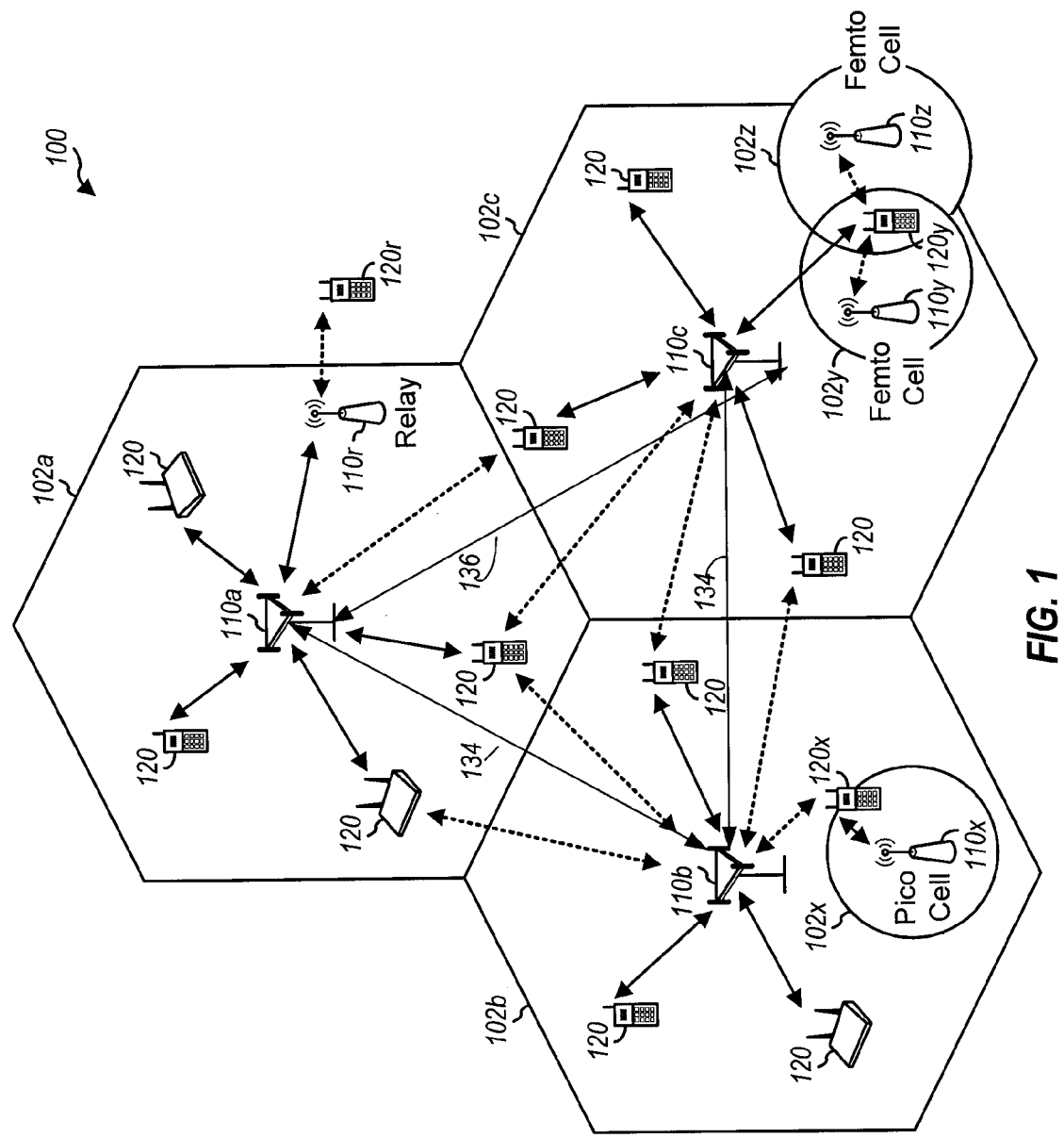
FIG. 1 is a block diagram illustrating an example of a mobile communication system.

FIG. 1 shows a wireless network 100 for communication, which may be an LTE-A network. The wireless network 100 includes a number of evolved node Bs (eNBs) 110 and other network entities. An eNB may be a station that communicates with the UEs and may also be referred to as a base station, a node B, an access point, and the like. Each eNB 110 may provide communication coverage for a particular geographic area. In 3GPP, the term "cell" can refer to this particular geographic coverage area of an eNB and/or an eNB subsystem serving the coverage area, depending on the context in which the term is used.

An eNB may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. In the example shown in FIG. 1, the eNBs 110a, 110b and 110c are macro eNBs for the macro cells 102a, 102b and 102c, respectively. The eNB 110x is a pico eNB for a pico cell 102x. And, the eNBs 110y and 110z are femto eNBs for the femto cells 102y and 102z, respectively. An eNB may support one or multiple (e.g., two, three, four, and the like) cells.

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time.

The UEs 120 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with macro eNBs, pico eNBs, femto eNBs, relays, and the like.

LTE/-A utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 72, 180, 300, 600, 900, and 1200 for a corresponding system bandwidth of 1.4, 3, 5, 10, 15, or 20 megahertz (MHz), respectively. The system bandwidth may also be partitioned into sub-bands. For example, a sub-band may cover 1.08 MHz, and there may be 1, 2, 4, 8 or 16 sub-bands for a corresponding system bandwidth of 1.4, 3, 5, 10, 15, or 20 MHz, respectively.

The wireless network 100 uses the diverse set of eNBs 110 (i.e., macro eNBs, pico eNBs, femto eNBs, and relays) to improve the spectral efficiency of the system per unit area. Because the wireless network 100 uses such different eNBs for its spectral coverage, it may also be referred to as a heterogeneous network. The macro eNBs 110a-c are usually carefully planned and placed by the provider of the wireless network 100. The macro eNBs 110a-c generally transmit at high power levels (e.g., 5 W-40 W). The pico eNB 110x and the relay station 110r, which generally transmit at substantially lower power levels (e.g., 100 mW-2 W), may be deployed in a relatively unplanned manner to eliminate coverage holes in the coverage area provided by the macro eNBs 110a-c and improve capacity in the hot spots. The femto eNBs 110y-z, which are typically deployed independently from the wireless network 100 may, nonetheless, be incorporated into the coverage area of the wireless network 100 either as a potential access point to the wireless network 100, if authorized by their administrator(s), or at least as an active and aware eNB that may communicate with the other eNBs 110 of the wireless network 100 to perform resource coordination and coordination of interference management. The femto eNBs 110y-z typically also transmit at substantially lower power levels (e.g., 100 mW-2 W) than the macro eNBs 110a-c.

Figure 2:
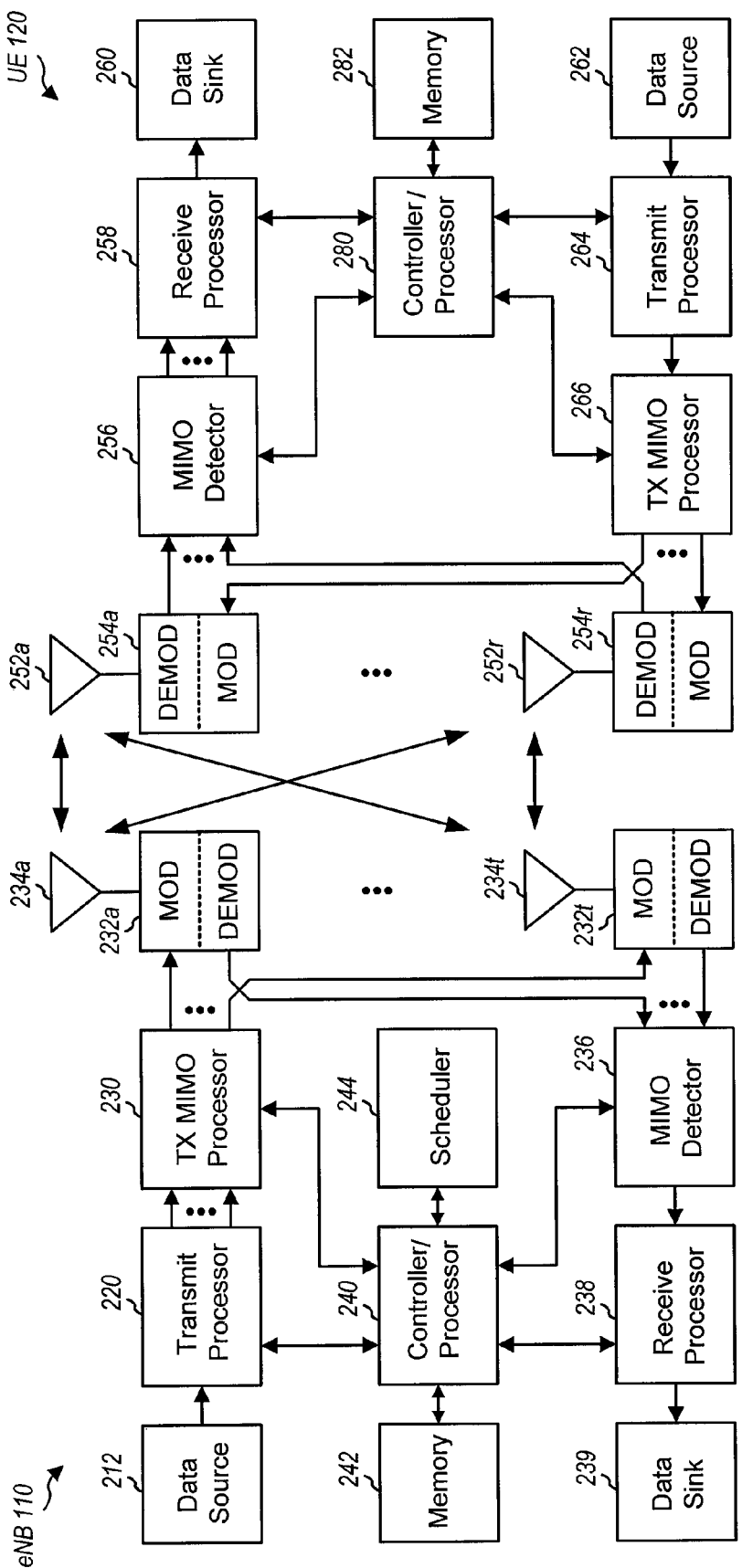
FIG. 2 is a block diagram illustrating a design of a base station/eNB and a UE configured according to one aspect of the present disclosure.

FIG. 2 shows a block diagram of a design of a base station/eNB 110 and a UE 120, which may be one of the base stations/eNBs and one of the UEs in FIG. 1. For a restricted association scenario, the eNB 110 may be the macro eNB 110c in FIG. 1, and the UE 120 may be the UE 120y. The eNB 110 may also be a base station of some other type. The eNB 110 may be equipped with antennas 234a through 234t, and the UE 120 may be equipped with antennas 252a through 252r.

At the eNB 110, a transmit processor 220 may receive data from a data source 212 and control information from a controller/processor 240. The control information may be for the PBCH, PCFICH, PHICH, PDCCH, etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 120, the antennas 252a through 252r may receive the downlink signals from the eNB 110 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 120 to a data sink 260, and provide decoded control information to a controller/processor 280.

On the uplink, at the UE 120, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the demodulators 254a through 254r (e.g., for SC-FDM, etc.), and transmitted to the eNB 110. At the eNB 110, the uplink signals from the UE 120 may be received by the antennas 234, processed by the modulators 232, detected by a MIMO detector 236 if applicable, and further processed by a receive processor 238 to obtain decoded data and control information sent by the UE 120. The processor 238 may provide the decoded data to a data sink 239 and the decoded control information to the controller/processor 240.

The controllers/processors 240 and 280 may direct the operation at the eNB 110 and the UE 120, respectively. The controller/processor 240 and/or other processors and modules at the eNB 110 may perform or direct the execution of various processes for the techniques described herein. The controllers/processor 280 and/or other processors and modules at the UE 120 may also perform or direct the execution of the functional blocks illustrated in FIG. 6, and/or other processes for the techniques described herein. The memories 242 and 582 may store data and program codes for the eNB 110 and the UE 120, respectively. A scheduler 244 may schedule UEs for data transmission on the downlink and/or uplink.

Figure 3:
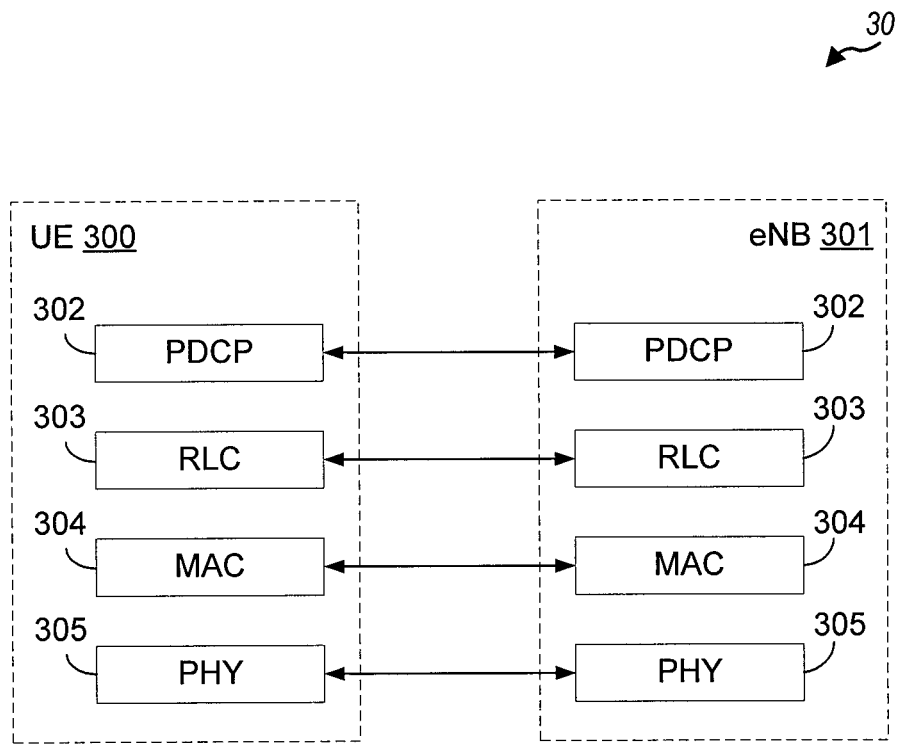
FIG. 3 is a block diagram illustrating a user plane protocol for communication between a UE and an eNB in the LTE standard.

In a wireless communication system, transmitters and receivers may communicate through a multiple layer protocol stack. FIG. 3 is a block diagram illustrating a user plane protocol 30 for communication between UE 300 and eNB 301 in the LTE standard. The LTE protocol stack may include a packet data convergence protocol (PDCP) layer 302, a radio link control (RLC) layer 303, a media access control (MAC) layer 304, and a physical (PHY) layer 305. PHY layer 305 performs the physical transport of data between UE 300 and eNB 301. Each layer of processing typically adds a header with administrative information that may be consumed by the corresponding layer at the intended recipient.

In LTE networks, each protocol layer in UE 300 and eNB 300 receives service data units (SDUs) from upper layers, processes them in protocol data units (PDUs) and sends PDUs to lower layers during downlink transmission. The reverse holds true for uplink transmission, where each layer receives PDUs from lower layers and sends SDUs to upper layers. The processing typically includes the addition and removal of headers. Of particular interest to this proposal is the PDCP layer. PDCP layer functions help transfer user plane and control plane data. When ciphering is enabled, PDCP processing includes the encryption and decryption of user and control plane bearers during uplink and downlink transmission, respectively. Other layers, including non-access stratum (NAS), may also include ciphering and integrity operations into their data processing. For example, NAS messages, which are within the control layer, may be ciphered and integrity protected by the NAS layer. The ciphering schemes which are described as a part of the various aspects of the present disclosure may apply to ciphering that may occur on any layer of the communication process, including the PDCP layer, NAS layer, and the like.

In cryptography, the original text or information is generally referred to as "plain text" while the encoded or altered text or information is generally referred to as "cipher text."

The conversion from plain text to cipher text is generally referred to as encoding, encrypting, enciphering, and the like, while the reverse operation is generally referred to as decoding, decrypting, deciphering, and the like. The encrypted data is sent over the public network and is decrypted by the intended recipient. Data encryption and decryption typically involve the generation and application of an encryption key. The key is typically generated using an encryption algorithm and special combination of initialization data that is known to both the sender and receiver. Thus, the sender and receiver can use this knowledge to generate the required encryption key to perform the necessary encryption and decryption of data.

Numerous encryption algorithms are used in modern communication systems. For example, RC4 is a widely used software stream cipher in protocols such as Secure Sockets Layer (SSL) and Wireless Encryption Protocol (WEP), and the like. In cellular communications, examples of encryption algorithms include Advanced Encryption Standard (AES), SNOW 3G, ZUC, and the like.

It is important that cellular communications be protected with encryption and integrity checks. Otherwise, it would be relatively easy for a technically knowledgeable person to monitor the traffic and/or alter the identity of the sender or receiver. Lack of security could lead to identify theft and loss of data, and also could allow an unauthorized third party to create a clone of the mobile device that would be recognized by the wireless network as the original device, potentially causing incorrect charges being assessed to the original device owner. However, there is a trade-off between security and performance and power efficiency. In order to achieve a high degree of security over a long period of time, a large amount of computational power is required. In a mobile platform, diverting computational power to security would degrade performance of the mobile device and greatly decrease battery life. To avoid this degradation of performance and battery life, optimizations are used to make specific tasks execute more efficiently.

The ZUC algorithm has been adopted as one of the standard encryption algorithms for 3GPP confidentiality and integrity operations. ZUC is a symmetric stream cipher algorithm that continuously generates ciphering keys that may be used both for encryption and decryption. The algorithm works in three main stages: Linear Feedback Shift Register (LFSR), Bit-Reorganization, and a non-linear function, F. The stages occur in this order with the non-linear function, F, outputting a 32-bit ciphering key. The next 32-bit ciphering key is generated by going through all of the stages again. Within the processing stages, various mathematical functions and techniques are used to generate properties of pseudo-randomness, so that the output appears random even though it is easily reproducible using the same initialization information.

During the operation of a cryptographic process, the key stream, which is a sequence of bits that is used to encrypt or decrypt data, is generally produced in 4-byte groups. Depending on the processor and register sizes, different methods of processing adjacent packets or keys may improve the efficiency of the system by reducing the overall number of operations that need to be performed. As disclosed herein, the ZUC cryptographic algorithm, which creates the key stream in 4-byte groups, can be adapted to operate in a 64-bit (8-byte) register and processing environment such that, when operating with the 64-bit register, only half of the number of XOR operations will be needed to operate on the input data stream. However, managing data alignment presents a number of challenges. As noted above, each processing layer may add its own headers and administrative overhead data to the data stream. Once that information is stripped out of the data stream, the data packets of plain text may not be uniformly aligned along register boundaries. Without uniform alignment in the data stream, inefficiencies are typically introduced to the process in order to make it work. Multiple solutions are possible to handle this unaligned data. Data packets may be internet protocol (IP) packets, simple data blocks, data packets, or the like.

One solution would be to handle the data on a byte-by-byte basis, allowing the stream to be processed without any regards to alignment. However, this solution would be very expensive in terms of resource utilization on the mobile device and ultimately result in a shorter battery life. Modern registers are typically 4- or 8-bytes in size which means that a majority of a register's space is wasted with such approach. In this context, resource utilization is defined as the effective use of system resources on the mobile device including central processing units (CPUs), caches, memory, and the like.

Another solution that has been suggested is a buffered mode. In buffered mode, plain text that starts at an unaligned boundary would be copied into a temporary aligned buffer before ciphering. Though this solution removes the need for considering misaligned leading bytes of the plain text, special consideration would still be required for handling the trailing bytes. Moreover, as with the byte-by-byte approach, the buffered mode is resource expensive. First, additional memory availability is required for the temporary buffer. Additionally, the copying and processing required for the temporary buffer may prevent the mobile device from reaching the high data rates required in LTE networks. For example, UE devices of the LTE category 3 support 100 mbps downlink and 50 mbps uplink.

A further solution is to shift the unaligned plain text into alignment with the key stream without using a temporary buffer. Because the key stream is generated in 4-byte groups, it is trivial to apply it in 4- or 8-byte groups. After applying the key stream to the plain text, re-aligning the output would require an additional shift to align it with the original plain text in order to achieve "in-place" operation. That is, the goal of this solution is to perfectly overwrite the original plain text with the generated cipher text. Therefore, additional work is required to fit the output exactly back into its original place. While this solution is not as resource-expensive as the byte-by-byte or buffered mode solutions, the extra shift operations add complexity to the overall solution.

Various aspects of the present disclosure provide a streaming mode ciphering/deciphering that occurs in-place on the plain text. The solution does not require copying of the plain text into a temporary aligned buffer, nor does it require any additional shift operations to align the plain text with the cipher keys and the resulting output. Instead, the cipher keys are shifted to align with the original plain text. Operations using the cipher keys occurs internally, in the processor's registers, without even the necessity of accessing the processor's cache, let alone going to external memory. This aspect provides fast computations with efficient resource utilization.

Figure 4:
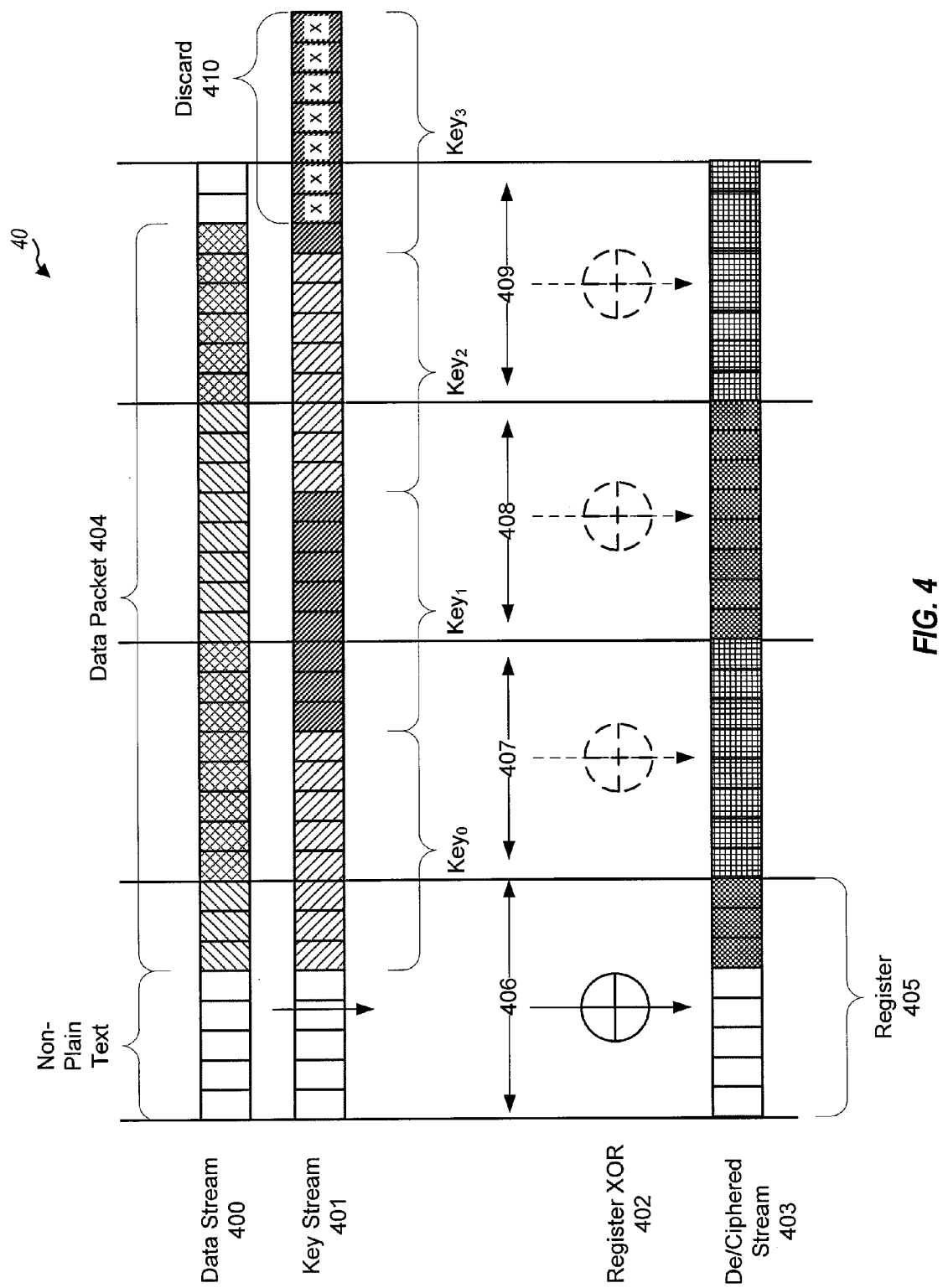
FIG. 4 is a block diagram illustrating a cipher process configured according to one aspect of the present disclosure.

FIG. 4 is a block diagram illustrating cipher process 40 configured according to one aspect of the present disclosure. Data stream 400 represents either plain text input that will be ciphered and transmitted wirelessly between wireless devices or cipher text that has been received from a transmitting device and is to be deciphered for further processing at a wireless apparatus. Data stream 400 includes both non-plain text data, which may be administrative data, such as headers or other administrative coding that may have been added by one of the user plane layers, such as PDCP, RLC, MAC, and the like, and plain text or cipher text to be processed by the cipher process. The non-plain text data may also be a result of fragmented packets that have missing bytes between data blocks.

The ciphering algorithm, such as the ZUC algorithm, produces key stream 401 including 8-byte keys $Key_0$, $Key_1$, $Key_2$, and $Key_3$. Data stream 400 and key stream 401 are processed in register 405 using XOR operation 402. The resulting de/ciphered stream 403 represents the ciphered or deciphered result of the cryptographic function. As the leading edge of data stream 400 begins processing, the wireless device knows the starting memory address of the actual payload or plain text. Based on this known starting address, the wireless device knows that the leading edge of data packet 404, illustrated in column 406, is unaligned with the boundary of register 405. Moreover the device knows the exact amount that the leading edge of data packet 404 is out of alignment. As illustrated, the leading edge of data packet 404 is 5-bytes or octets shifted to the right. Accordingly, the device right-shifts $Key_0$ by 5-bytes, thus, aligning key stream 401 with the plain text of data stream 400. The aligned plain text and $Key_0$ is then properly processed at register XOR 402 to produce the de/ciphered stream 403 illustrated in column 406.

The next portion of plain text block of data packet 404 of data stream 400 to be processed, as illustrated in column 407, is 8-byte-aligned. However, because the leading edge of data packet 404 illustrated in column 406 was processed using only the first 3-bytes of $Key_0$, the next portion of plain text in the same data packet 404 are processed using a combination of the remaining bytes of $Key_0$ and the first bytes of $Key_1$. 5-bytes of $Key_0$ were shifted beyond the boundary of register 405. These 5-bytes of $Key_0$ were saved for the next processing operation. In order to form a full 8-byte key, $Key_1$ is right-shifted 5-bytes and combined with the remainder of $Key_0$, as illustrated in column 407. The combined key of the portions of $Key_0$ and $Key_1$ is then processed with the second block of data packet 404 in register 405 using register XOR 402 to produce the de/ciphered stream 403 represented in column 407.

The next portion of plain text block of data packet 404 of data stream 400 to be processed, as illustrated in column 408, is also 8-byte-aligned. The combined key applied includes the 5-bytes of $Key_1$ shifted beyond the boundary of register 405 and the first 3-bytes of $Key_2$, right-shifted by 5-bytes. The combined key and the next plain text block of data packet 404 are processed by register XOR 402 to produce de/ciphered stream 403 illustrated in column 408.

Data packet 404 ends at column 409 with the trailing edge ending 2-bytes before the boundary. When receiving data packet 404 of data stream 400, the device has a record of the starting memory address and the length of data packet 404. Accordingly, the device will determine that the trailing edge is 2-bytes short of the boundary. To process the trailing edge of data packet 404, the combined key includes the 5-bytes of $Key_2$ shifted over the boundary of register 405 and the first byte of $Key_3$, which has been right-shifted by 5-bytes. The combined key is processed with the trailing edge of data packet 404 by register XOR 402 to produce de/ciphered stream 403 as illustrated in column 409. Because the wireless device knows that it has reached the end of data packet 404, it discards the remaining 7-bytes of $Key_3$ shifted beyond the last byte of data packet 404. Each new data packet processed in data stream 400 will trigger re-initialization of the cipher algorithm, thus, generating a new key stream for the cryptographic function.

In operation, the data stream (either of cipher text received at the destination device or plain text to be encrypted and transmitted by the originating device) is stored in buffers for processing. Each buffer has a fixed size. A data packet may fit completely within a single buffer, may be combined with another data packet in the buffer, or may fit partially within two buffers. When a single data packet crosses into two separate buffers, those buffers are considered chained together. Thus, any remaining key bytes that were shifted outside of the boundary when processing the last portion of an data packet in a first buffer would be saved for application to the remaining portions of the data packet that occurs in the next buffer.

Figure 5:
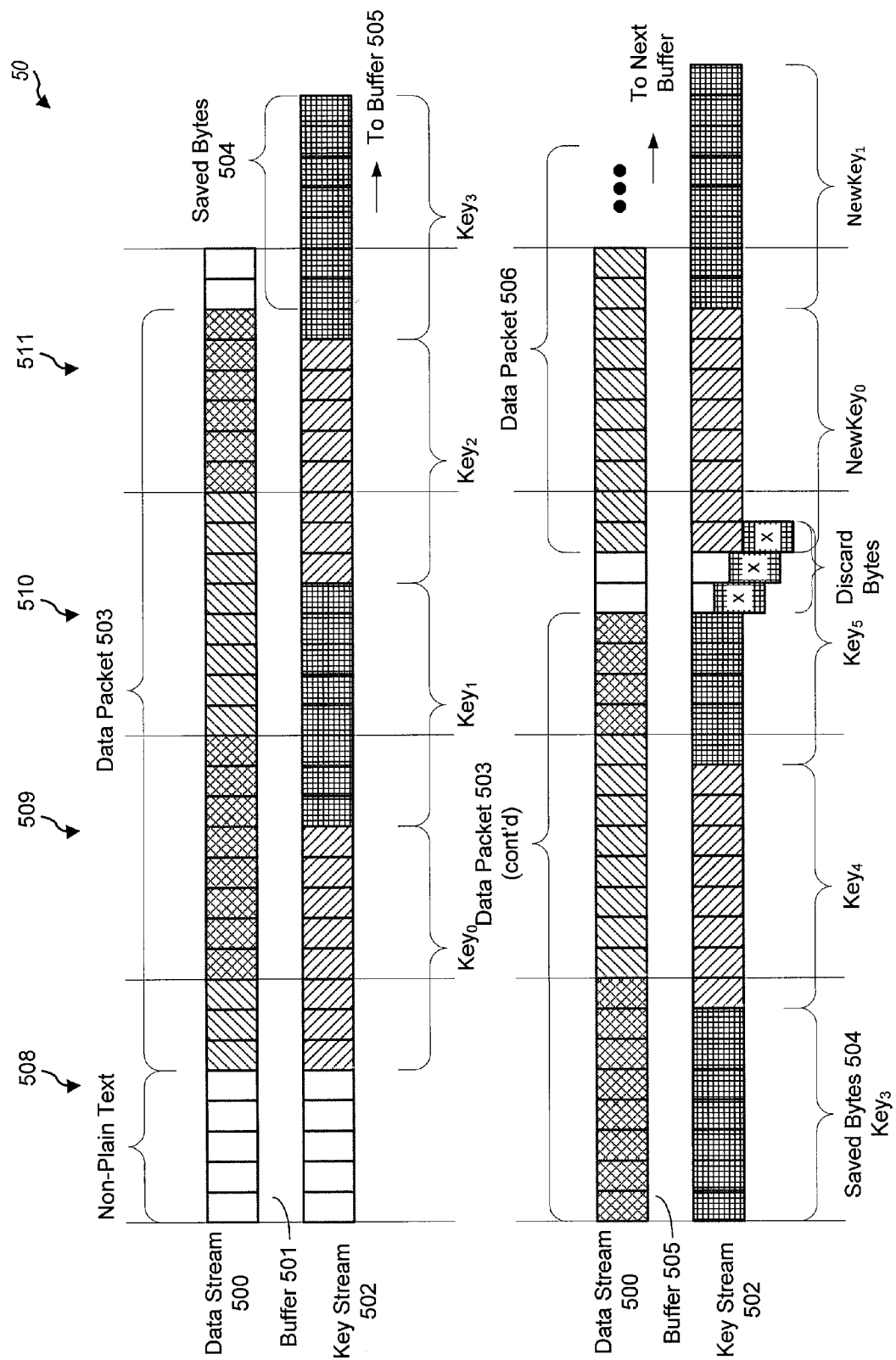
FIG. 5 is a block diagram illustrating a cipher process configured according to one aspect of the present disclosure.

FIG. 5 is a block diagram illustrating cipher process 50 configured according to one aspect of the present disclosure. The example of cipher process 50 illustrated in FIG. 5 shows the data stream 500 and key stream 502 for two buffers, buffers 501 and 505, used for cryptographic processing. The cipher processor and register, such as register XOR 402 and register 405 of FIG. 4, are not shown for the sake of clarity. However, it should be noted that, while not illustrated in FIG. 5, the data packets of data stream 500 are processed with the cipher keys of key stream 502 using a cipher component operation in a register of the wireless device.

It should be further noted that different sizes of registers and processor buffers may be used when implementing various aspects of the present disclosure.

Column 508 of buffer 501 illustrates the leading edge of data packet 503. Based on the known starting address of data packet 503, the apparatus knows that data packet 503 is unaligned and right-shifts $Key_0$, of key stream 502, 5-bytes in order to align with the leading edge of data packet 503. The data stream 500 will, thus, be processed through the plain or ciphered text of data packet 503 and the aligned bytes of $Key_0$. Columns 509 and 510 illustrate 8-byte-aligned sections of data packet 503 to be processed. The keys of key stream 502 are combinations of generated keys that are shifted to accommodate for the initial shifting of Key0. Thus, the combined key for processing in column 509 combines the last 5-bytes of Key0 shifted beyond the register boundary when processing column 508 and the first 3-bytes of $Key_1$ remaining in column 509 that are right-shifted 5-bytes, and the combined key for processing in column 510 combines the last 5-bytes of $Key_1$ and the first 3-bytes of $Key_2$, formed in a similar manner.

During operations, plain or cipher text within data packets may be broken up in fragmented packets. Thus, there may be "blank" bytes located between plain or cipher text within the same data packet. The apparatus processing the plain or cipher text knows the locations of the breaks, and will, therefore, be able to accommodate the key shifting according to the locations of the plain or cipher text to be processed. Column 511 illustrates the ending memory locations of buffer 501. The processing apparatus recognizes that data packet 503 is fragmented and the trailing edge of the plain or cipher text in column 511, while aligned, has 2-bytes of trailing non-plain text data. Accordingly, when forming the combined key of key stream 502 for processing the unaligned trailing edge of data packet 503 in buffer 501, the apparatus combines the 5-bytes of $Key_2$ that were shifted over the register boundary when processing the data of column 510 and the first byte of $Key_3$, which was shifted 5-bytes to accommodate the aligning key shifting. Therefore, the remaining 7-bytes of $Key_3$ are not used in processing the unaligned fragment of data packet 503. Because the processing apparatus knows that data packet 503 has additional data to be processed, it creates saved bytes 504 that includes the unused 7-bytes of $Key_3$ that will be applied to the next processed block of data packet 503.

When processing moves on to buffer 505, the first bytes of data stream 500 in column 508 of buffer 505 are 8-byte-aligned plain or cipher text of the continuation of data packet 503. The processing apparatus retrieves saved bytes 504 to form the combined key of key stream 502. The combined key includes the 7-bytes remaining after processing of the trailing edge text in column 511 of buffer 501 and the first byte of $Key_4$, which has been right-shifted 7-bytes to accommodate for the use of saved bytes 504. The text of column 509 of buffer 505 is also byte-aligned and will be processed with a combined key of 7-bytes of $Key_4$ and 1-byte of $Key_5$. The known length of data packet 503 indicates to the processing apparatus that data packet 503 will be ending in column 510 of buffer 505. The trailing edge of data packet 503 in buffer 505 is unaligned. Accordingly, the combined key comprises only the 4-bytes that were shifted beyond the register boundary when processing the text in column 509 of buffer 505. The remaining 3-bytes of $Key_5$ are discarded as data packet 503 comes to an end.

In order to optimize processing, each buffer is filled with as many bytes of plain or cipher text to be processed as possible. Accordingly, the leading edge of data packet 506 is stored as illustrated in column 510 of buffer 505. After two non-plain text bytes, the leading edge of data packet 506 begins without byte alignment. With the beginning of a new data packet, the ciphering algorithm is re-initiated to provide new keys to key stream 502. With the unaligned portion of data packet 506, the processing apparatus right-shifts $NewKey_0$ 6-bytes to align with the leading edge of data packet 506. The final bytes of buffer 505, as illustrated in column 511, are byte-aligned and will be processed by a combined key including the remaining 6-bytes of $NewKey_0$ and the first 2-bytes of $NewKey_1$, which are right-shifted 6-bytes to accommodate the shifting alignment. As data packet 506 continues in the next buffer, the processing apparatus saves the remaining bytes of $NewKey_1$ for processing the next block of plain or cipher text in data packet 506.

Figure 6:
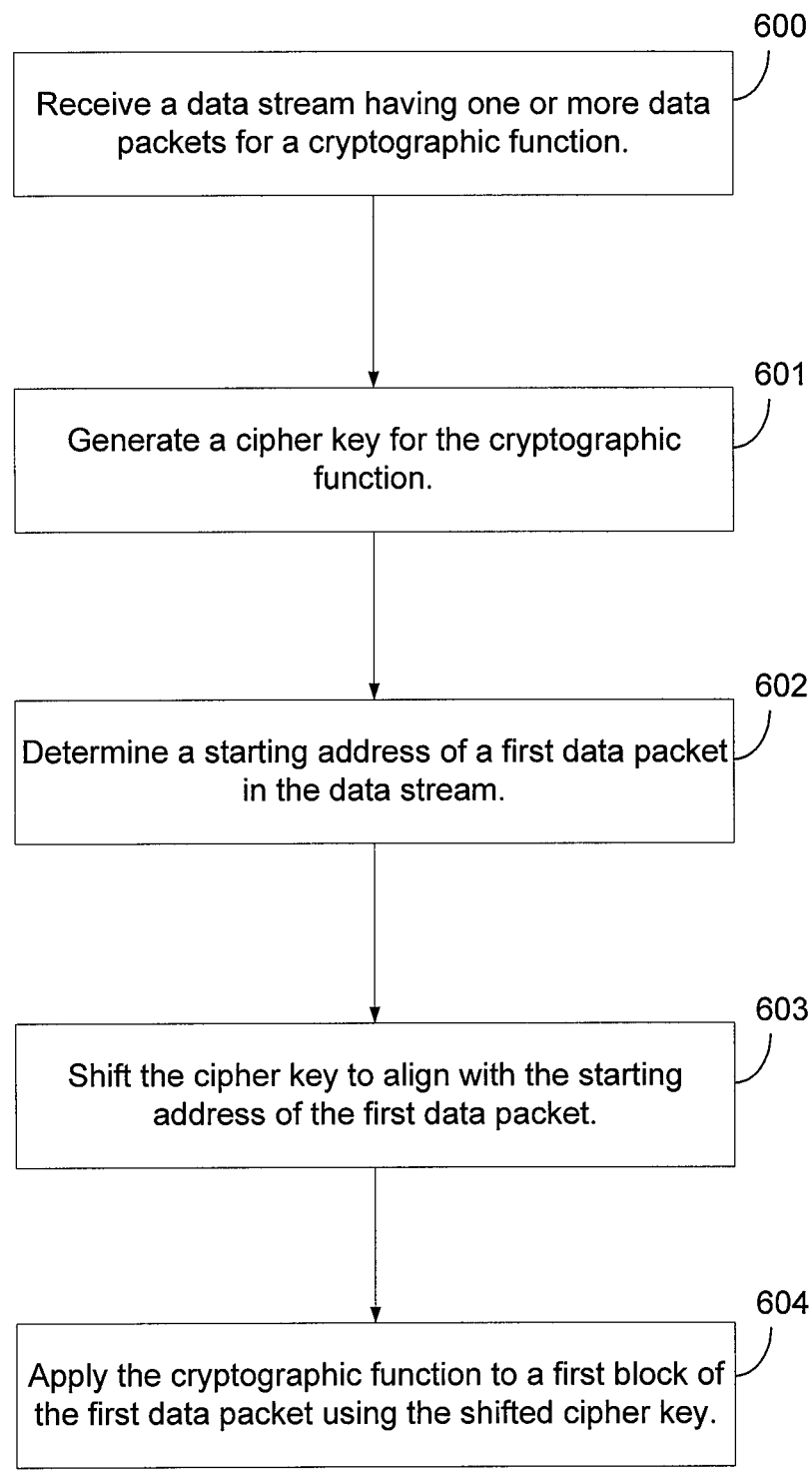
FIG. 6 is a functional block diagram illustrating example blocks executed to implement one aspect of the present disclosure.

FIG. 6 is a diagram illustrating example blocks executed to implement one aspect of the present disclosure. At block 600, a data stream is received having one or more data packets for a cryptographic function. The data stream contains data packets of plain or cipher text to be processed by the cryptographic function. The processing apparatus generates a cipher key, at block 601, for the cryptographic function. At block 602, the processing apparatus determines a starting address of a first data packet in the data stream. When the processing apparatus receives the data stream, it typically knows the starting address and length of the data. The processing apparatus shifts the cipher key, at block 603, to align with the starting address of the first data packet. At block 604, the processing apparatus applies the cryptographic function to a first block of the first data packet using the shifted cipher key. By shifting the cipher key to align with the data stream, the resulting processed ciphered or deciphered text result remains in line with the original data stream.

Figure 7:
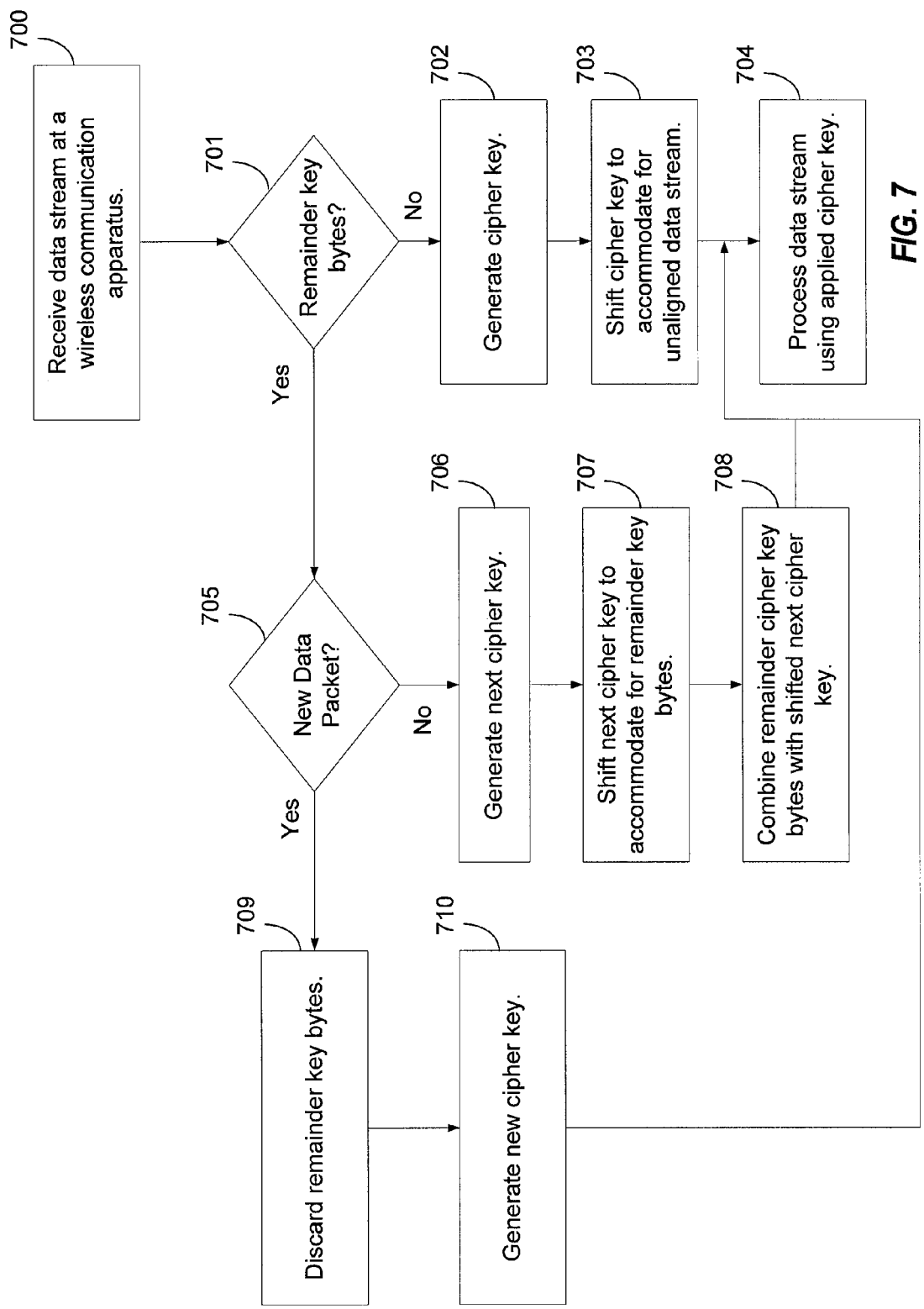
FIG. 7 is a functional block diagram illustrating example blocks executed to implement one aspect of the present disclosure.

FIG. 7 is a diagram illustrating example blocks executed to implement one aspect of the present disclosure. At block 700, a data stream is received having one or more data packets for a cryptographic function. In processing the plain or cipher text of the data stream, a determination is made, at block 701, whether there are remainder key bytes stored in memory from a previous processing of an unaligned data block. If not, then a cipher key is generated at block 702. The processing apparatus shifts the cipher key, at block 703, to accommodate unaligned data blocks of the data stream. The data stream is then processed, at block 704, using the applied cipher key.

If there are remainder key bytes from a previous application of the cryptographic function, then, another determination is made, in block 705, whether the next data blocks to be processed are a part of the same data packet or a new data packet. If the data blocks are a part of the same data packet then, at block 706, a next cipher key is generated by the processing apparatus. At block 707, the next cipher key is shifted by a number of bytes to accommodate the remainder key bytes from the previous processing operation. The processing apparatus then combines the remainder cipher key bytes with the shifted next cipher byte at block 708. The apparatus then processes the data stream, at block 704, using the applied cipher key, which, in this circumstance, is the combination of the previous remainder cipher key bytes and the shifted bytes of the next cipher key.

If, in response to the determination of block 705, the next data blocks to be processed are part of a new data packet, then, at block 709, the processing apparatus discards the remainder cipher key bytes from the previous operation and, at block 710, generates a new cipher key. The data stream is then processed, at block 704, using the applied cipher key which, in this new data packet circumstance, is a newly generated cipher key from the re-initiated key stream.

Figure 8:
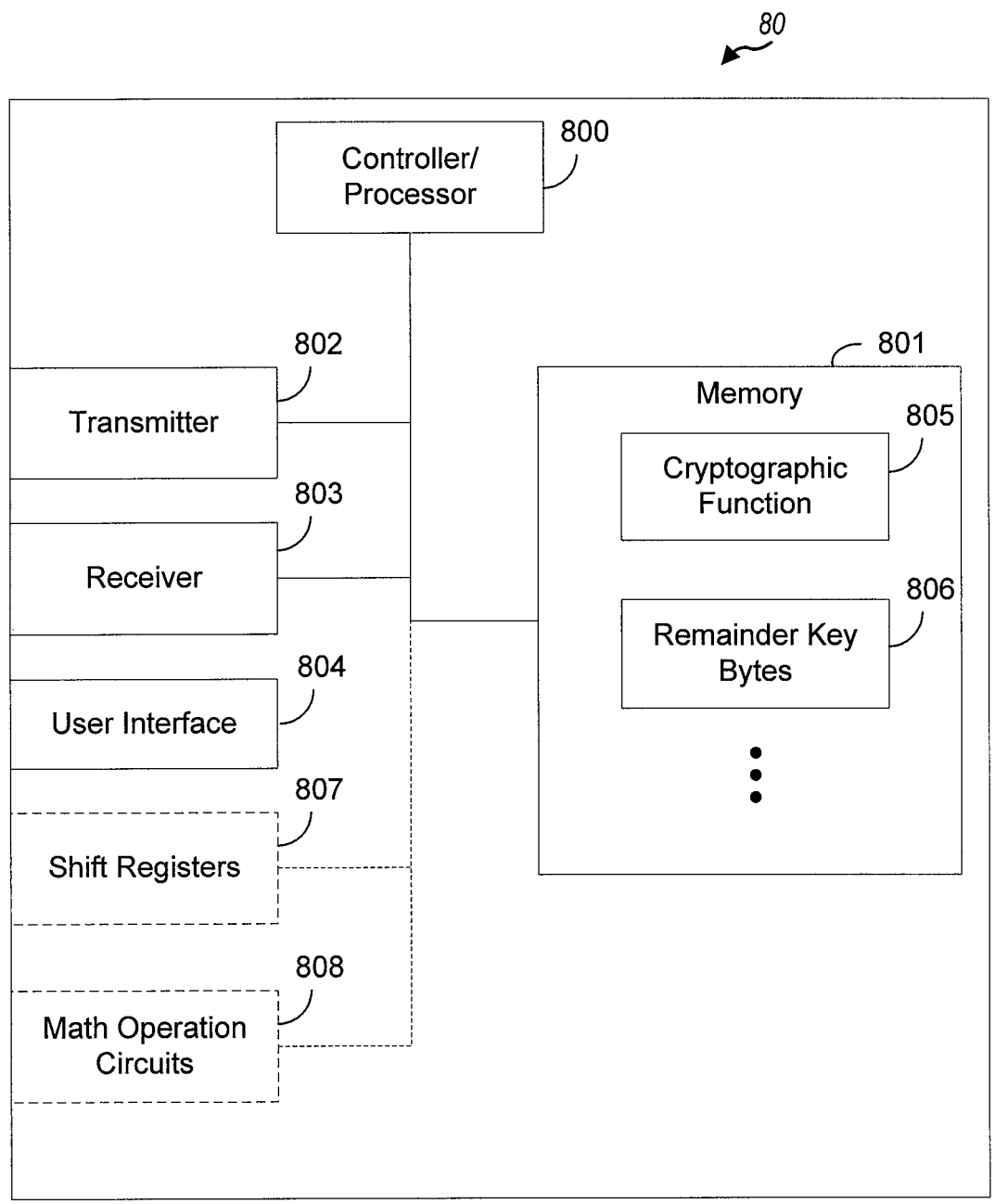
FIG. 8 is a block diagram of a wireless communication apparatus configured according to one aspect of the present disclosure.

FIG. 8 is a block diagram of a wireless communication apparatus 80 configured according to one aspect of the present disclosure. Wireless communication apparatus 80 includes a number of components including, among others not shown, controller/processor 800, memory 801, transmitter 802, receiver 803, and user interface 804. Controller/processor 800 controls the hardware functionality and executes applications and logic stored in memory 801 that provides the features and functionality of wireless communication device 80. Wireless communication apparatus 80 may be implemented as a transmitter or receiver entity, which may be a mobile device, access point, base station, or the like.

When operating as a transmitter, wireless communication apparatus 80 may receive a data stream through user interface 804. User interface 804, under control of controller/processor 800 captures user input from various input sources, such as a touch screen, camera, microphone, or the like entered by the user. The captured data stream represents data that the user desires to transmit to another user. When operating as a receiver, wireless communication apparatus 80 may receive a data stream via receiver 803 under control of controller/processor 800. The encrypted text received in the data stream originates from the sender and, in order to use the information and data transmitted, the user of wireless communication apparatus 80 will first decipher the encrypted text into plain text. The combination of these components and acts may provide means for receiving a data stream at a wireless communication apparatus for a cryptographic function and means for applying the cryptographic function to the data stream.

When ciphering or deciphering is needed in order to either prepare plain text for transmission to an intended party or to discover the plain text obscured in the encrypted text, wireless communication apparatus 80, under control of controller/processor 800 executes a cryptographic function, such as cryptographic function 805, stored in memory 801, for processing the data stream. Cryptographic function 805, as executed by controller/processor 800, may provide a purely software encryption process or may provide a combination process that utilizes both software functions executed by controller/processor 800 and activity of operation circuits, such as shift registers 807 and math operation circuits 808, which may include adders, subtractors, comparators, and which may further include bitwise versions of various mathematical operations, such as bitwise AND, XOR, NOT, and the like. The combination of these components and actions may provide means for generating a cipher key for the cryptographic function.

As the wireless communication apparatus 80 receives the data stream, part of stripping away the headers includes decoding information about the plain or encrypted text included in the data stream. This data, which will often include the length of the data, will be read and stored in memory 801 with its address in memory stored as well. The receiver 803 and user interface 804, under control of controller/processor 800, interprets this information in the headers of the received data stream, or records this information with regard to input data stored from user interface 804 to memory 801. When processing begins for the data blocks controller/processor 800 retrieves the starting address from memory 801 to determine the alignment of the data stream. The combination of these components and actions may provide means for determining a starting address of a first data packet in the data stream.

When the starting address of the first data packet of the data stream to be processed indicates that the data stream is unaligned, controller/processor 800 operates software based shift operations in cryptographic function 805 or controls physical components, such as shift registers 807 to shift the cipher key in order to align the key with the unaligned data stream. The combination of these components and actions may provide means for shifting the cipher key to align with the starting address of the first data packet.

Once the cipher key has been shifted into alignment with the unaligned data stream, wireless communication apparatus 80 may process the data stream to either decipher the encrypted text of a data stream received from receiver 803 or to encipher the plain text of a data stream received from user interface 804. Controller/processor 800, via execution of cryptographic function 805 processes the data stream using the shifted cipher key. The processing may be accomplished using software operations or by using circuit components, such as those in math operations circuits 808. The combination of these components and actions may provide means for applying the cryptographic function to a first block of the first data packet using the shifted cipher key. If the shifting of the cipher key shifts any of the cipher key bytes beyond a register boundary, controller/processor 800 stores those remainder key bytes 806 in memory 801 if the next data blocks to be processed are a part of the same data packet. Otherwise, the remainder key bytes are discarded.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 6 and 7 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
receiving, at a wireless communication apparatus, a data stream having one or more data packets for a cryptographic function;
generating a cipher key for the cryptographic function;
determining a starting address of a first data packet in the data stream;
determining a misalignment between the starting address of the first data packet and the cipher key, wherein the misalignment is determined as a number of bits;
shifting the cipher key by the number of bits, wherein the shifting aligns the cipher key with the starting address of the first data packet to eliminate the determined misalignment; and
applying the cryptographic function to a first block of the first data packet using the shifted cipher key.

2. The method of claim 1, further comprising:
detecting an adjacent block of the first data packet;
determining a remainder of the cipher key shifted beyond the first block;
generating a next cipher key for the cryptographic function;
shifting the next cipher key by a size of the remainder;
combining the remainder with the next cipher key to create a combined cipher key; and
applying the cryptographic function to the adjacent block of the first data packet using the combined cipher key.

3. The method of claim 2, further comprising:
detecting an end of the first data packet; and
discarding a next remainder of the combined cipher key shifted beyond the adjacent block.

4. The method of claim 3, further comprising:
detecting a next data packet of the data stream;
determining a next starting address of the next data packet;
generating a new cipher key for the cryptographic function;
shifting the new cipher key to align with the next starting address of the next data packet; and
applying the cryptographic function to a first block of the next data packet using the shifted new cipher key.

5. The method of claim 1, wherein the cryptographic function comprises a ZUC algorithm.

6. The method of claim 1, wherein the cryptographic function is implemented in at least one of: a packet data convergence protocol (PDCP) layer, or a non-access stratum (NAS) layer of the wireless communication apparatus.

7. The method of claim 1, further comprising:
detecting a misalignment of the first data packet with respect to a processing register.

8. The method of claim 1, wherein the one or more data packets are fragmented into a plurality of fragments, the method further comprising applying the cipher key to the fragments comprising the first data packet and the next cipher key to the fragments comprising a second data packet in the data stream.

9. An apparatus configured for wireless communication, comprising:
means for receiving, at a wireless communication apparatus, a data stream having one or more data packets for a cryptographic function;
means for generating a cipher key for the cryptographic function;
means for determining a starting address of a first data packet in the data stream;
means for determining a misalignment between the starting address of the first data packet and the cipher key, wherein the misalignment is determined as a number of bits;
means for shifting the cipher key by the number of bits, wherein the shifting aligns the cipher key with the starting address of the first data packet to eliminate the determined misalignment; and
means for applying the cryptographic function to a first block of the first data packet using the shifted cipher key.

10. The apparatus of claim 9, further comprising:
means for detecting an adjacent block of the first data packet;
means for determining a remainder of the cipher key shifted beyond the first block;
means for generating a next cipher key for the cryptographic function;
means for shifting the next cipher key by a size of the remainder;
means for combining the remainder with the next cipher key to create a combined cipher key; and
means for applying the cryptographic function to the adjacent block of the first data packet using the combined cipher key.

11. The apparatus of claim 10, further comprising:
means for detecting an end of the first data packet; and
means for discarding a next remainder of the combined cipher key shifted beyond the adjacent block.

12. The apparatus of claim 11, further comprising:
means for detecting a next data packet of the data stream;
means for determining a next starting address of the next data packet;
means for generating a new cipher key for the cryptographic function;
means for shifting the new cipher key to align with the next starting address of the next data packet; and
means for applying the cryptographic function to a first block of the next data packet using the shifted new cipher key.

13. The apparatus of claim 9, wherein the cryptographic function comprises a ZUC algorithm.

14. The apparatus of claim 9, wherein the cryptographic function is implemented in at least one of: a packet data convergence protocol (PDCP) layer, or a non-access stratum (NAS) layer of the wireless communication apparatus.

15. The apparatus of claim 9, further comprising:
means for detecting a misalignment of the first data packet with respect to a processing register.

16. The apparatus of claim 9, wherein the one or more data packets are fragmented into a plurality of fragments, the apparatus further comprising means for applying the cipher key to the fragments comprising the first data packet and a next cipher key to fragments comprising a second data packet in the data stream.

17. A computer program product for wireless communications in a wireless network, comprising:
a non-transitory computer-readable medium having program code recorded thereon, the program code including:
program code to receive, at a wireless communication apparatus, a data stream having one or more data packets for a cryptographic function;

program code to generate a cipher key for the cryptographic function;
program code to determine a starting address of a first data packet in the data stream;
program code to determine a misalignment between the starting address of the first data packet and the cipher key, wherein the misalignment is determined as a number of bits;
program code to shift the cipher key by the number of bits, wherein the shifting aligns the cipher key with the starting address of the first data packet to eliminate the determined misalignment; and
program code to apply the cryptographic function to a first block of the first data packet using the shifted cipher key.

18. The computer program product of claim 17, further comprising:
program code to detect an adjacent block of the first data packet;
program code to determine a remainder of the cipher key shifted beyond the first block;
program code to generate a next cipher key for the cryptographic function;
program code to shift the next cipher key by a size of the remainder;
program code to combine the remainder with the next cipher key to create a combined cipher key; and
program code to apply the cryptographic function to the adjacent block of the first data packet using the combined cipher key.

19. The computer program product of claim 18, further comprising:
program code to detect an end of the first data packet; and
program code to discard a next remainder of the combined cipher key shifted beyond the adjacent block.

20. The computer program product of claim 19, further comprising:
program code to detect a next data packet of the data stream;
program code to determine a next starting address of the next data packet;
program code to generate a new cipher key for the cryptographic function;
program code to shift the new cipher key to align with the next starting address of the next data packet; and
program code to apply the cryptographic function to a first block of the next data packet using the shifted new cipher key.

21. The computer program product of claim 17, wherein the cryptographic function comprises a ZUC algorithm.

22. The computer program product of claim 17, wherein the cryptographic function is implemented in at least one of: a packet data convergence protocol (PDCP) layer, or a non-access stratum (NAS) layer of the wireless communication apparatus.

23. The computer program product of claim 17, further comprising:
program code to detect a misalignment of the first data packet with respect to a processing register.

24. The computer program product of claim 17, wherein the one or more data packets are fragmented into a plurality of fragments, the computer program product further comprising program code to apply the cipher key to fragments comprising the first data packet and the next cipher key to the fragments comprising a second data packet in the data stream.

25. An apparatus configured for wireless communication, the apparatus comprising:
at least one processor; and
a memory coupled to the at least one processor,
wherein the at least one processor is configured:
to receive, at a wireless communication apparatus, a data stream having one or more data packets for a cryptographic function;
to generate a cipher key for the cryptographic function;
to determine a starting address of a first data packet in the data stream;
to determine a misalignment between the starting address of the first data packet and the cipher key, wherein the misalignment is determined as a number of bits;
to shift the cipher key by the number of bits, wherein the shifting aligns the cipher key with the starting address of the first data packet to eliminate the determined misalignment; and
to apply the cryptographic function to a first block of the first data packet using the shifted cipher key.

26. The apparatus of claim 25, wherein the at least one processor is further configured:
to detect an adjacent block of the first data packet;
to determine a remainder of the cipher key shifted beyond the first block;
to generate a next cipher key for the cryptographic function;
to shift the next cipher key by a size of the remainder;
to combine the remainder with the next cipher key to create a combined cipher key; and
to apply the cryptographic function to the adjacent block of the first data packet using the combined cipher key.

27. The apparatus of claim 26, wherein the at least one processor is further configured:
to detect an end of the first data packet; and
to discard a next remainder of the combined cipher key shifted beyond the adjacent block.

28. The apparatus of claim 27, wherein the at least one processor is further configured:
to detect a next data packet of the data stream;
to determine a next starting address of the next data packet;
to generate a new cipher key for the cryptographic function;
to shift the new cipher key to align with the next starting address of the next data packet; and
to apply the cryptographic function to a first block of the next data packet using the shifted new cipher key.

29. The apparatus of claim 25, wherein the cryptographic function comprises a ZUC algorithm.

30. The apparatus of claim 25, wherein the cryptographic function is implemented in at least one of: a packet data convergence protocol (PDCP) layer, or a non-access stratum (NAS) layer of the wireless communication apparatus.

31. The apparatus of claim 25, wherein the at least one processor is further configured to detect a misalignment of the first data packet with respect to a processing register.

32. The apparatus of claim 25, wherein the one or more data packets are fragmented into a plurality of fragments, the at least one processor further configured to apply the cipher key to the fragments comprising the first data packet and the next cipher key to the fragments comprising a second data packet in the data stream.

* * * * *